United States Patent
Batten

(10) Patent No.: US 6,238,572 B1
(45) Date of Patent: *May 29, 2001

(54) SEPARATION TANK MODULE FOR KITCHEN EFFLUENT

(75) Inventor: William C. Batten, Asheboro, NC (US)

(73) Assignee: Clearline Systems, Inc., Asheboro, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,856

(22) Filed: Jul. 21, 1998

(51) Int. Cl.$^7$ ........................................ C02F 1/40
(52) U.S. Cl. ..................... 210/739; 210/740; 210/744; 210/800; 210/801; 210/803
(58) Field of Search ........................ 210/519, 532.1, 210/540, 703, 708, 739, 740, 744, 800, 801, 803

(56) References Cited

U.S. PATENT DOCUMENTS

| | | | |
|---|---|---|---|
| 2,747,736 | * 5/1956 | Mobley . | |
| 3,224,593 | 12/1965 | Nebolsine | 210/519 |
| 4,119,541 | * 10/1978 | Makaya . | |
| 4,293,416 | 10/1981 | Keoteklian | 210/208 |
| 4,400,274 | * 8/1983 | Protos . | |
| 4,428,839 | 1/1984 | Davies et al. | 210/512.3 |
| 4,492,635 | 1/1985 | Stigebrandt | 210/519 |
| 4,596,586 | 6/1986 | Davies et al. | 55/52 |
| 4,615,870 | 10/1986 | Armstrong et al. | 422/191 |
| 4,681,682 | * 7/1987 | White et al. . | |
| 4,824,579 | 4/1989 | George | 210/703 |
| 4,915,823 | * 4/1990 | Hall . | |
| 4,994,179 | * 2/1991 | Keeter et al. . | |
| 5,053,126 | 10/1991 | Krasnoff | 210/188 |
| 5,098,564 | * 3/1992 | Miller et al. . | |
| 5,178,754 | * 1/1993 | Batten et al. . | |
| 5,236,585 | * 8/1993 | Fink . | |
| 5,362,407 | * 11/1994 | Elmi . | |
| 5,543,064 | * 8/1996 | Batten . | |
| 5,840,198 | * 11/1998 | Clarke . | |

FOREIGN PATENT DOCUMENTS 2 035 150    11/1978   (GB) .

* cited by examiner

Primary Examiner—W. L. Walker
Assistant Examiner—Michael A. Fleming
(74) Attorney, Agent, or Firm—Rhodes & Mason, PLLC

(57) ABSTRACT

An apparatus for the separation of immiscible liquids from liquid influent has a containment vessel. An influent channel extends toward the bottom of the vessel so the influent is discharged vertically upward, a downwardly curved deflection plate is mounted above and aligned with the discharge end of the influent channel, and a plate with a downward slope from a central location extends toward the periphery of the vessel in a lower portion of the vessel than the deflection plate. This permits the influent to move radially outwardly thus slowing the influent and providing a residence time for gravitational separation of lighter immiscible liquids from the influent. A gap between the downward slope plate and the discharge end of the influent channel permits gravitational release of trapped immiscible liquids. A transfer tube, a sensor, and a pump are provided to pump the separated immiscible liquids out to a remote location. A suction conduit suctions heavier-than-water solids from the bottom of the vessel and an effluent channel channels the separated water to a remote location, such as a sewer.

6 Claims, 2 Drawing Sheets

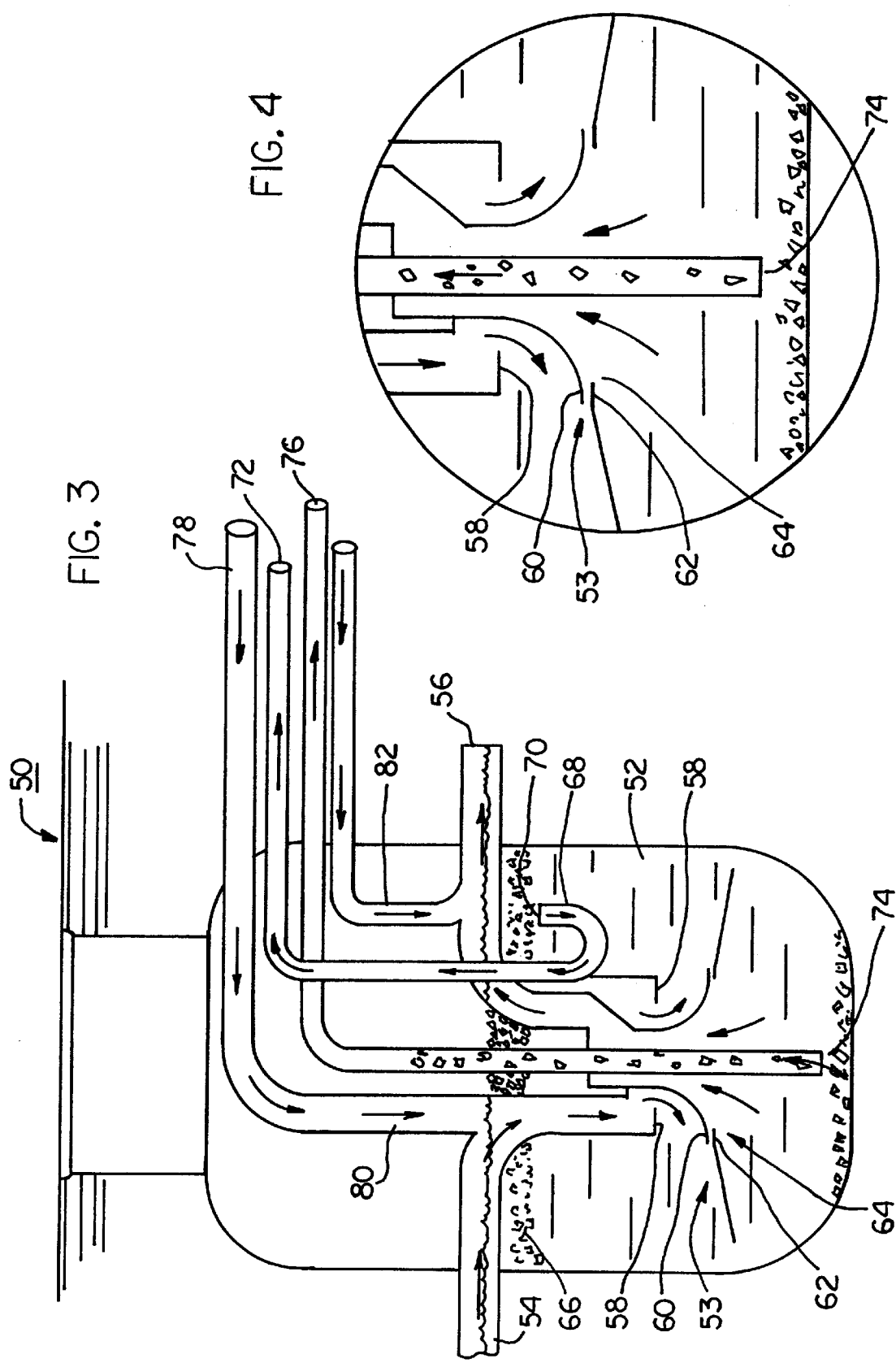

SEPARATION TANK MODULE FOR KITCHEN EFFLUENT

BACKGROUND OF THE INVENTION

This invention relates to a method and apparatus for separating two immiscible liquids, for example, kitchen effluent contains a mixture of grease, water and solids.

Kitchen effluent generated during food processing has conventionally been collected in a grease trap separator, which is commonly a rectangular tank made of pre-cast concrete, buried below grade. In the separator, the grease, being of a lower density than the water, rises to the top, forming a separate grease mat layer. Periodically, the grease is removed from the trap, normally with a vacuum pump. The grease may then be disposed of in a landfill or sold to rendering companies for conversion into useful products.

Processing of the grease into useful products is obviously preferred to dumping of the grease into a landfill, which also may not be possible due to the increased environmental regulations. Processors, however, are not always willing to accept grease if it includes a significant percentage of water, i.e., more than fifteen percent (15%), because of the increased difficulty in processing. Moreover, the prolonged contact of water with the grease tends to make the grease rancid as a result of the breakdown of lipids into shorter chain fatty acids, decreasing the value of the grease.

The prior art discloses various methods and apparatus for separating two immiscible liquids, and also discloses various methods and apparatus for removing one liquid from contact with the other after separation of liquids into two layers in a separator. For example, in some cases, the lighter liquid is discharged by gravity from the separator through an upper pipe and the heavier liquid is discharged from the separator through a lower pipe. Generally, the methods and apparatus relate to the separation of grease or oil from water.

U.S. Pat. No. 2,747,736 to Mobley describes a device for removing grease from wastewater in a separator, in which grease which floats to the top of the separator is removed by hydrostatic forces. The grease is then stored at a collecting and storage point remote from the separator.

U.S. Pat. No. 5,236,585 to Sink describes an apparatus comprised of a separator in which oil and water are separated. The oil, which floats to the top of the water, flows under gravity to a second separator, where remaining oil is removed, e.g., by filtration. Water is removed from the bottom of the first separator.

Other patents show similar devices. U.S. Pat. No. 4,915,823 to Hall, describes a device for separating oil from water in bilge discharges. After separation, the oil and water are removed through separate discharge pipes. U.S. Pat. No. 4,119,541 to Makaya, discloses a similar arrangement for cleaning up oil spills by separating oil from seawater. U.S. Pat. No. 4,400,274 to Protos, describes a gravity separator in which solids are removed prior to separation of the grease and water. Those systems often suffer the problem of incomplete removal of grease from the water, leading to waste of recyclable grease, and perhaps more importantly, the need to treat the water more thoroughly because of the residual grease contaminants.

The kinds of apparatus disclosed in the prior art, however, are not readily adaptable for use with the thousands of conventional grease traps that currently exist. Since these traps are generally comprised of a concrete storage tank buried several feet below ground level, i.e., grade, which has a pair of generally cylindrical access ports fitted with manhole covers, removal or structural modification is difficult. An apparatus which would permit removal of grease from water with great efficiency in conventional grease traps would be of substantial commercial utility.

Further, there is a need in the art for a new apparatus for separation of oil/grease from wastewater which is simple in design so that service is not often needed, yet capable of being done in the field by simple replacement of easily replaceable parts.

SUMMARY OF THE INVENTION

The current invention is useful in retrofitting existing separation systems, such as grease traps, many of which are located below grade. After modification of the grease trap with the present invention, the first liquid (grease) can be periodically and automatically removed and transported to a remote location.

While the invention is described in terms of the separation of grease from water, it will be apparent that the apparatus and method described herein are generally useful in the separation of any immiscible liquids.

The apparatus includes a containment vessel, an influent channel having an intake end and a discharge end disposed into a central region of the vessel, an effluent channel disposed in the vessel having an intake end in a lower portion of the vessel and a discharge end. A plate in a lower portion of the vessel has a downward slope from a central location toward the periphery of the vessel and is mounted downstream of flow from the discharge end of the influent channel. Influent liquid can be introduced into the vessel through the influent channel for discharge centrally into the vessel to permit radially outward movement of the influent to slow the influent and provide residence time for gravitational separation of lighter immiscible liquids from the main liquid flow.

The apparatus may include a transfer tube with an intake end and a discharging end with the intake end located in an upper portion of the vessel. It may also include a sensor for sensing immiscible liquids within an upper portion of the vessel and a pump actuable upon the sensor sensing immiscible liquids to pump from the vessel.

The apparatus may have a vertically extending suction conduit having an intake end and a discharge end, whereby the intake end can be inserted through the center portion of the vessel to permit the suction of heavier-than-water solids from the bottom portion of the vessel.

In one preferred embodiment the influent end is inserted from the upper portion of the vessel so the influent flow is discharged vertically downward. Thereafter, the influent is collected on an upwardly curved deflection plate mounted below and aligned with the discharge end of the influent channel. The downward slope plate is in a lower portion of the vessel than the deflection plate to provide an overhang from an outer peripheral portion of the deflection plate above an inner central portion of the downward slope plate.

In another embodiment, the influent end is inserted from the bottom portion of the containment vessel so the influent flow is discharged vertically upward. In this embodiment, a downwardly curved deflection plate is mounted above and aligned with the discharge end of the influent channel. The downward slope plate is mounted to the discharge end of the influent channel so the downward slope plate is in a lower portion of the vessel from the deflection plate. Further, one portion has a gap between the discharge end of the influent channel and the downward slope plate.

An embodiment of the vessel may be vertically extending with a generally rounded bottom, formed of roto-formed plastic and having a cover. Such a cover may have a flat top surface, a radial inwardly upwardly slanted bottom surface and an opening through the middle. Further, the channels, preferably, are made of vacuum formed plastic.

In the preferred embodiment, a conical plate is used to define the bottom of the vessel, the influent channel is disposed vertically along one side of the vessel, the effluent channel is disposed vertically along another side of the vessel such that the central peripheral portion of the channels is mounted to the outer peripheral portion of the conical plate.

The apparatus may have a gray water conduit, having an intake end from a remote location and a discharge end disposed into an upstream location of the discharge end of the influent channel. It may also have a transfer tube, with an intake end located in the upper portion of the vessel and a discharge end in a remote location for recovery of the separated grease. Additionally it may have a vertically extending suction conduit, having an intake end inserted through the center portion of the vessel to permit the suction of heavier-than-water solids from the bottom portion of the vessel and a discharge end disposed in a remote recovery system. Also, it may have an automatic solids transfer discharging line with an intake end in a remote location to discharge the solids.

The invention also provides a method of operation including separating influent made up of a lighter density first liquid and a heavier density second liquid in a containment vessel and transferring the first and second liquids to discrete remote locations by channeling the influent into the containment vessel, directing the influent flow to a radially central portion of the vessel and releasing the influent in the vessel to permit radial outward movement of the influent which causes an increasing reduction in influent flow velocity as the influent moves radially outward, gravitationally separating the first liquid from the second liquid as they move radially outwardly, transferring the first liquid from an upper portion of the vessel to a remote location, and transferring the second liquid from a lower portion of the vessel to another remote location.

For automatic operation, the method may include the intermediate steps of sensing when the upper portion of the vessel contains a substantial quantity of the first liquid and thereafter performing the first transferring step.

The method may also include the step of suctioning solids heavier than the second liquid from the bottom of the vessel through a conduit to a remote location.

These and other aspects of the present invention will become apparent to those skilled in the art after a reading of the following description of the invention when considered with the drawings.

BRIEF DESCRIPTION OF THE DRAWINGS

FIG. 3 is a schematic sectional view of an apparatus for grease suction recovery according to a second embodiment of the invention.

FIG. 4 is a detailed view of the plates according to the embodiment of FIG. 3.

DETAILED DESCRIPTION OF THE INVENTION

Figure 2:
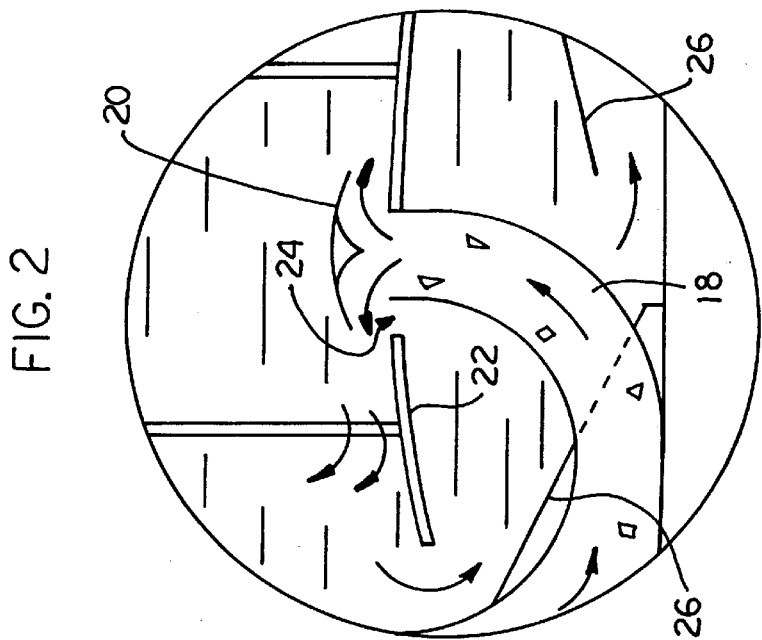
FIG. 2 is a detailed view of the plates according to the embodiment of FIG. 1.
Figure 1:
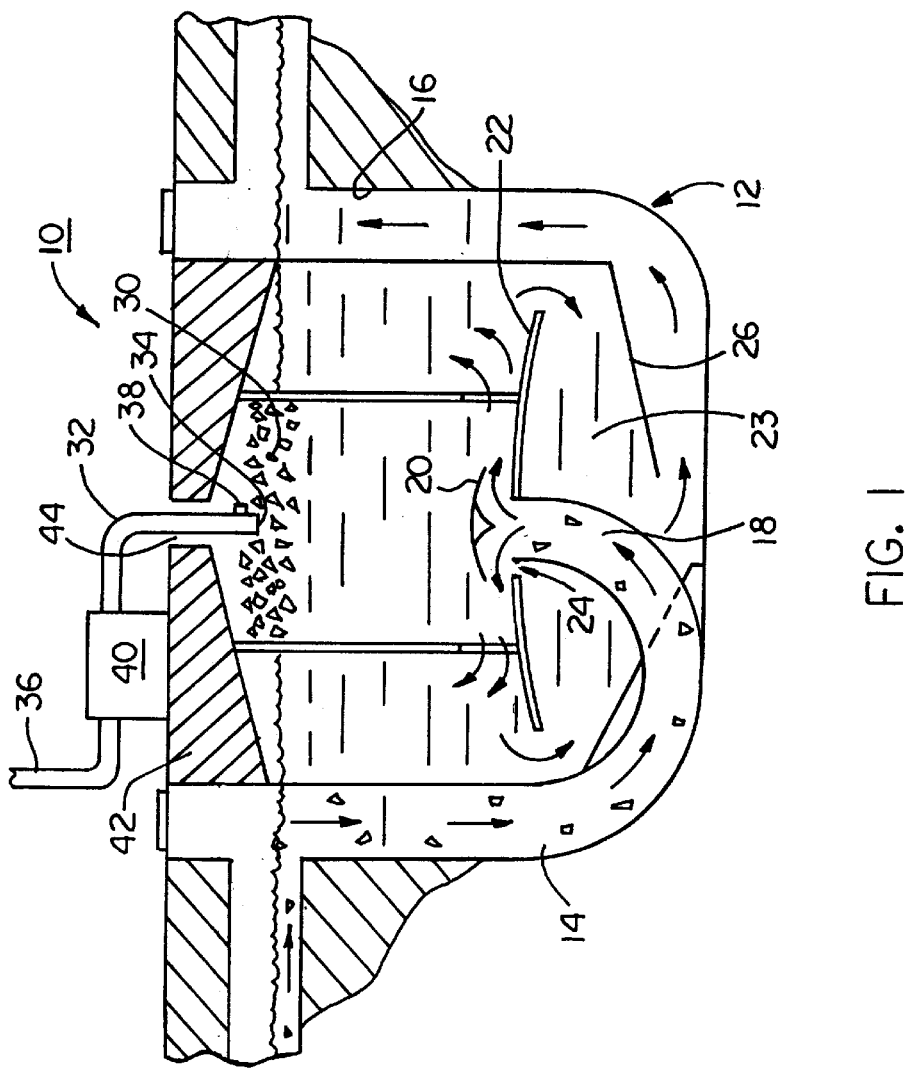
FIG. 1 is a schematic sectional view of an apparatus for grease suction recovery according to one embodiment of the invention.

FIGS. 1 and 2 illustrate one embodiment for an apparatus 10 for grease suction recovery, which includes a separation vessel 12 having an influent channel 14 and an effluent channel 16 each of rectangular cross section disposed at the sides of the separation vessel 12.

The shape of vessel 12 is not critical, however the preferred embodiment has a rounded or conical shaped bottom and vertical walls that are smooth to effectuate the flow of the grease. As used herein "grease" may include oils and other lighter than water liquids commonly found in grease traps. As is well known, the "grease" rises to the top of the aqueous waste water. The vessel 12 can be formed of a variety of materials such as steel or fiberglass. However roto-formed plastic is the preferred embodiment due to its lightweight characteristics.

The apparatus 10 has an influent channel 14 and an effluent channel 16. The channels 14, 16, as well, can be formed of a variety of materials, but the preferred embodiment uses vacuum formed plastic.

The discharge end 18 of influent channel 14 enters upwardly into the center of vessel 12. The flow of the influent is directed radially outwardly through the use of a diverging, disk-shaped plate 20. Plate 20 has a parabolic radial configuration and is supported above discharge end 18 of influent channel 14 through any suitable securing means. Plate 20 creates an outward radial diversion of the influent into vessel 12. Then, the influent is thus directed along the upper surface of a conical plate 22 which has a downward slope. The area of this path increases as the square of the radius and thus increasingly allows the influent a longer residence time, to maximize the likelihood of gravitational separation of the less dense grease from the water. Conical plate 22 is supported through any appropriate suitable means and has a small gap 24 between itself and the discharge end 18 of the influent channel 14 along one edge to permit the removal of any grease that may otherwise have become trapped under the plate 22. This grease is thus exposed, once again, to radial diversion and eventual separation.

The grease-depleted water passes radially outwardly past the periphery of plate 22 and then downwardly to a region 23 in the bottom of vessel 12. From there it is discharged through an effluent transfer channel 16. Effluent channel 16 discharges to a remote location, such as a sewage treatment plant. Influent channel 14 and effluent channel 16 are preferable formed with an additional conical plate 26 to define the bottom of vessel 12.

A grease mat 30 is formed by the accumulated separated grease at the top of the vessel 12. A grease transfer tube 32 is positioned with an intake end 34 in contact with the grease mat 30 inside the vessel 12, and a discharge end 36. Transfer tube 32 is configured with a sensor 38 positioned to detect grease accumulation in vessel 12. Sensor 38 is of a type commercially available and its selection can be made by one skilled in the art. Suction of the grease through the transfer tube 32 is accomplished through a pump 40 or any such suitable means, which is actuated by the sensor 38.

The vessel 12 is topped with a cover 42 having a center opening 44. Cover 42 has a flat top surface and an upward slanted bottom surface to facilitate the flow of grease to the center where the intake end 34 of the grease transfer tube 32 is located.

FIGS. 3 and 4 illustrate a second embodiment 50 of the present invention which has a vessel 52, an influent channel 54 and an effluent channel 56. The discharge end 58 of the influent channel 54 is directed vertically downward into the middle of vessel 52. Preferably, the discharge is through an annular opening with effluent channel 56 centered in the opening. The influent is first directed against radially curved deflection plate 60. Plate 60 is mounted below and aligned with discharge end 58. The influent passes onto a downward slope plate 62. The outer portion of deflection plate 60 overhangs the inner portion of downward slope plate 62 to provide a gap 64 between plates 60 and 62. Again, the influent takes on a radially outward flow path in the region 53. As it slows, the grease rises and the water falls.

A grease mat 66 is formed by the accumulated separated grease at the top of the vessel 52. A grease transfer tube 68 is positioned with an intake end 70 in contact with grease mat 66 inside vessel 52, and a discharge end 72.

Additional features that may be included are a gray water return conduit 78 from a remote source such as a Superceptor® product sold by Thermaco and described in U.S. Pat. No. 5,178,754 and an automatic solids transfer discharge conduit 82 for returning solids from an AST unit sold by Thermaco and described in U.S. Pat. No. 5,098,564. The disclosures of these patents are hereby incorporated by reference. Gray water conduit 78 has a discharge end 80 in communication with discharge end 58 of influent channel 54. The gray water flow is therefore subjected to radial gravitational separation along with the influent. Solids are transferred through conduit 82 and discharged in communication with the effluent out through the effluent channel 56 to a remote location, such as a sewer leading to a sewage treatment plant.

Also, for discharge of heavier-than-water solids that accumulate at the bottom of the vessel 52, a suction conduit 76 is located in the vessel 52. Suction conduit 76 takes up the solids from the bottom of vessel 52 through its intake end 74 and delivers the solids to a remote location.

The separation characteristics are improved in the instant invention over the prior art. Namely, the use of baffles allows the radial and outward flow of the waste water, to permit the gradual slowing of the flow, to increase the residence time, allowing the grease an opportunity to rise and deviate from the main water flow path. There is no agitation required to effectuate the separation, and therefore there are fewer moving parts. Further, there are no chemical additives necessary to supplement the separation.

While this invention has been illustrated and described in accordance with a preferred embodiment, it is recognized that variations and changes may be made therein without departing from the invention as set forth in the claims.

What is claimed is:

1. A method for the separation of influent containing a lighter density first liquid and a heavier density second liquid in a containment vessel and transferring said first and second liquids to discrete remote locations comprising the steps of:
    channeling said influent into the containment vessel,
    directing an influent flow to a radially central portion of the vessel and releasing the influent in an open area of the vessel,
    impinging the influent flow against a downwardly diverging plate whereby to radially divert the first and second liquids toward outer regions of an open area of the vessel thereby causing an increasing reduction in influent flow velocity as the influent moves radially outward,
    as the influent moves radially outward to outer regions of the open area, gravitationally separating the first liquid to a higher location in the vessel than the second liquid,
    a first act of transferring including transferring the first liquid from an upper portion of the vessel to a remote location, and
    a second act of transferring including transferring the second liquid form a lower portion of the vessel to another remote location.

2. The method as in claim 1, further comprising an intermediate step of sensing when an upper portion of said vessel contains a substantial quantity of said first liquid and thereafter performing said first transferring act.

3. The method as in claim 1, further comprising a step of suctioning solids heavier than said second liquid from a bottom of said vessel through a conduit to a remote location.

4. The method as in claim 1, wherein said act of transferring the first liquid includes transferring grease and said step of transferring the second liquid includes transferring water.

5. A method as claimed in claim 1 further comprising:
    sensing immiscible liquids within an upper portion of said vessel, and upon sensing immiscible liquids pumping separated lighter, immiscible liquid from said vessel.

6. A method as claimed in claim 1 wherein said step of directing includes discharging influent flow vertically upwardly into the central portion.

* * * * *